350-376 SR SEARCH ROOM

XR 3,585,614

[redacted] [redacted]

[11] 3,585,614

[72] Inventor William J. Tabor
New Providence, N.J.
[21] Appl. No. 827,389
[22] Filed May 23, 1969
[45] Patented June 15, 1971
[73] Assignee Bell Telephone Laboratories, Incorporated
Murray Hill, Berkely Heights, N.J.

[54] FARADAY EFFECT READOUT OF MAGNETIC DOMAINS IN MAGNETIC MATERIALS EXHIBITING BIREFRINGENCE
10 Claims, 12 Drawing Figs.

[52] U.S. Cl. .......... 340/174, 350/151, 350/157, 350/161
[51] Int. Cl. .......... G11c 11/14, G02f 1/22, G02f 1/24
[50] Field of Search .......... 340/174 TF, 174 YC; 350/150, 151, 157, 161

[56] References Cited
UNITED STATES PATENTS
3,420,601 1/1969 Young et al. .......... 350/151

*Primary Examiner*—James W. Moffitt
*Attorneys*—R. J. Guenther and Kenneth B. Hamlin

ABSTRACT: A plurality of layers of magnetic birefringent material exhibiting Faraday rotation changes the periodic effect of birefringence on that rotation, characteristic of a single layer of such material, into a continual enhancement of Faraday rotation if each of those layers is less than a critical thickness and if adjacent layers are oriented at about 90° with respect to one another. Optical readout of single wall domain propagation devices is improved by arranging at least a readout position accordingly.

3585614
OR IN 365/10

INVENTOR
W. J. TABOR
BY Herbert M. Shapiro
ATTORNEY

| INPUT TO I | OUTPUT OF I | OUTPUT OF II |
|---|---|---|
| ↑ a° | ↑ a +90° | ↑ a° <br> ↗ χ a +90° |
| | ↗ χa° | ↗ χ a +90° |

FARADAY EFFECT READOUT OF MAGNETIC DOMAINS IN MAGNETIC MATERIALS EXHIBITING BIREFRINGENCE

FIELD OF THE INVENTION

This invention relates to data processing devices and more particularly to magnetic data processing devices including materials which exhibit both Faraday rotation and birefringence.

BACKGROUND OF THE INVENTION

My copending application Ser. No. 664,780, filed Aug. 31, 1967 now U.S. Pat. No. 3,515,456, describes improvements in the optical readout of magnetic devices in which single wall domains are moved.

A single wall domain is a reverse-magnetized domain bounded in the plane of the sheet in which it is moved by a single domain wall which closes on itself and which does not intersect the edge of the magnetic sheet in which such a domain is moved. The Bell System Technical Journal (BSTJ), Volume XLVI, No. 8, Oct. 1967, at page 1901 et seq., describes the propagation of single wall domains in some detail.

These domains are detected conveniently by passing polarized light through an output position into which domains are moved. The magnetization of the domain interacts with the polarization vector of the light to cause a rotation of the vector, a phenomenon known as the Faraday effect. An analyzer, set to extinguish background light, passes light to a detector only if a domain is present in the output position.

In materials exhibiting Faraday rotation but no birefringence, the amount of rotation is directly proportional to the length of the light path in the material. Consequently, the thicker the sheet through which the light is passed, the greater one would expect the Faraday rotation to be. This is not the case in sheets of orthoferrite material in which single wall domains are moved. In these materials, in fact, the amount of Faraday rotation is a periodic function of sheet thickness, a discovery which is the basis of my above-mentioned copending application.

The reason for this unexpected relationship between Faraday rotation and sheet thickness is due to the birefringence. For example, the rare earth orthoferrites are representative materials and are known to exhibit birefringence. If a given magnetic sheet is the *a*, *b* (crystallographic) plane is thought of as comprising a number of imaginary planes of incremental thickness, then, for incident light having its polarization vector parallel to the *a* axis of the crystal, Faraday rotation explains the existence of a component also along the *b* axis as light passes each layer. Birefringence considerations dictate that each such component has an associated phase retardation.

My aforementioned application explains that when a domain is present for detection, the retarded component so generated (is "positive") adds to enhance Faraday rotation so long as the phase retardation does not exceed 180°, and that the enhancement (is "negative") diminishes as the sheet thickness dictates greater than 180° retardation. The enhancement again (is positive) increases when the thickness is sufficiently thick that retardation next exceeds zero establishing a periodic relationship between birefringence and Faraday rotation in magnetic materials exhibiting both properties. Of course, when a domain is absent, negative rotation occurs.

Contrast between the two conditions is enhanced by increasing the amount of rotation up to a limit 90°.

An object of this invention is to provide such a device in which the contribution of birefringence to Faraday rotation is not periodic but additive thus enhancing that contrast.

BRIEF DESCRIPTION OF THE INVENTION

This invention is based on the realization that birefringence always operates to enhance Faraday rotation if the magnetic sheet through which polarized light is transmitted is structured so that the birefringence is always positive when a domain is present and always negative when a domain is absent.

In one embodiment of this invention, continual enhancement of Faraday rotation is achieved by passing polarized light through a sheet comprising a plurality of layers of birefringent magnetic material each of which has a thickness, along the optical path, equal to or less than the thickness at which birefringence causes a 180° phase retardation as described in my above-mentioned application but wherein each layer has its crystallographic axis at about 90° with respect to the adjacent layers.

In another embodiment, a granular layered structure comprises particles in a suitable binder where each particle is a single crystal having a nominal thickness in a range substantially less than that which produces more than 180° retardation.

In domain propagation devices in accordance with this invention, at least the position in a sheet of material at which the presence or absence of domains is detected includes overlays of either the multilayered or granular layer arrangement in addition to the sheet in which the single wall domains are moved. So long as that sheet is of appropriate thickness, Faraday rotation is as large as the total thickness of the material dictates. The limiting thickness of the layered structure is dictated by absorption considerations as is the case in nonbirefringent materials.

DETAILED DESCRIPTION

Figure 1:
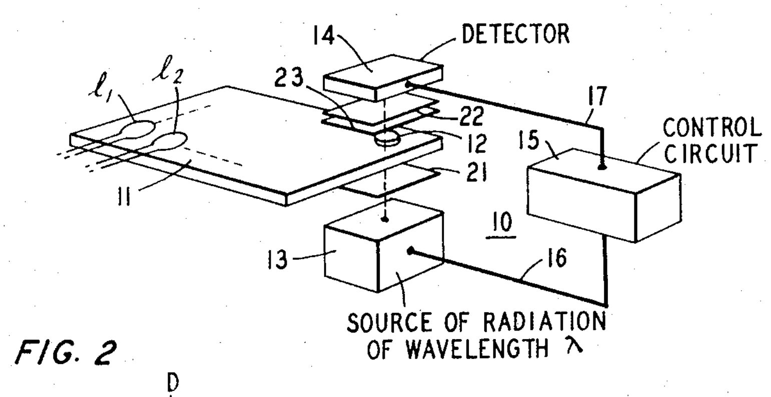
FIG. 1 shows a schematic illustration of a device in which an optical detection arrangement in accordance with this invention is associated with a sheet of magnetic material in which single wall domains are moved.

FIG. 1 shows a memory arrangement 10 adapted for optical readout in accordance with this invention. The arrangement comprises a magnetic sheet 11 which is conveniently a rare earth orthoferrite. Single wall domains are provided and moved controllably in such sheets as disclosed in the above-mentioned BSTJ article.

We are concerned primarily with the readout implementation here. Accordingly, the means for providing domains initially and for moving those domains in the magnetic sheet are not shown fully. These means are well known as shown in the above-mentioned BSTJ article. It may be assumed that such means are present and enable the presence and absence of domains to be provided controllably at an output position 12 in FIG. 1. Loops $l_1$ and $l_2$ in the figure represent the means for so moving the domains.

Faraday rotation is employed to detect the presence and absence of domains in the output position. To this end, a source 13 capable of providing radiation of wavelength $\lambda$, conveniently a laser, is positioned to direct radiation at output position 12. A detector 14 is positioned to detect radiation which passes sheet 11 at position 12. Source 13 and detector 14 are connected to a control circuit 15 via conductors 16 and 17, respectively.

Figure 2:
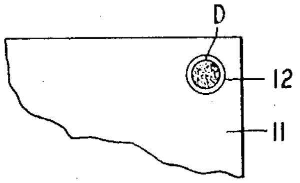
FIGS. 2, 5, 8, and 9 show an output position in the magnetic sheet of FIG. 1.

In FIG. 1, the output position is represented by a closed line (12). As shown in that figure, no domain is present within the area enclosed by that line. FIG. 2, on the other hand, shows the output position occupied by a domain D represented by a blackened circle so designated. Light from source 13 of FIG. 1 provides a relatively low output pulse P*o* in detector 14 when a domain is absent and a relatively high output Pl when a domain is present in output position 12 as indicated in FIG. 3.

Figure 3:
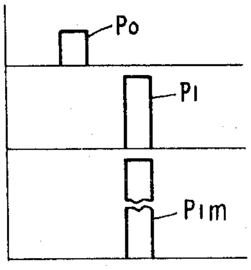
FIG. 3 is a pulse diagram illustrating the outputs detected for magnetic sheets of FIG. 1 structured in accordance with this invention.

As explained in detail in my aforementioned application, if sheet 11 is of a suitable thickness, the amplitude of pulse Pl may be made large as indicated by the pulse P1*m* in FIG. 3. If care is not exercised in the selection of a sheet thickness, light passing through the output position when a domain is present may be extinguished and pulse Pl will be undetectable.

In accordance with the present invention, the amplitude of pulse P1*m* is increased even further by a plurality of sheets (or layers) of orthoferrite material, each of a suitable thickness, as indicated at 12 in FIG. 1, it being assumed that the magnetic field produced by the single wall domain switches the additional multilayered structure at 12 in FIG. 1. The pulse P1*m* increases as the number of layers is increased until absorption reduces the overall light level below permissible limits. The number of layers is optimum when the light loss due to absorption is equal to the insertion loss due to the less than 90° Faraday rotation.

Figure 4:
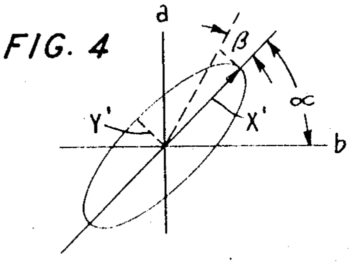
FIG. 4 is a geometric representation of an elliptically polarized vector in accordance with this invention.

An understanding of the relationship between birefringence and Faraday rotation is obtained from a physical model. Assume polarized light is incident to a birefringent crystal so that at the output of the crystal the direction of the (elliptic) polarization vector is at some angle $\alpha$ to the crystallographic axes $a$ and $b$ as shown in FIG. 4. The light, then, has a component along each axis. If, in addition, a magnetic field is present in the crystal, each component is rotated, each component in turn having components along each axis.

Figure 5:
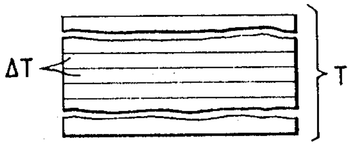

If the crystal is taken as comprising a number of planes of incremental thickness ($\Delta T$) as shown in FIG. 5, then each consecutive plane may be thought of as having each component of light from the next preceding plane transmitted through it. Each plane rotates each of those components. Again, each component, so rotated, gives rise to an additional pair of components, one along each axis.

Each plane also is associated with a birefringence. It is convenient to express the effect of the birefringence of each plane as a phase change or retardation of one component with respect to the other of a pair. This enables us to ignore, for the moment, the nonretarded component, say along the $a$ axis, and to direct our attention to that component, say along the $b$ axis, which is retarded.

Figure 6:
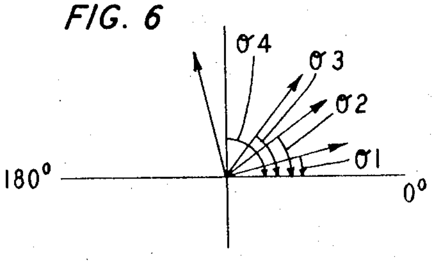
FIGS. 6, 7, and 10 are illustrations representing the polarization vectors in the various crystal layers herein in accordance with an assumed model.

The effect of consecutive planes on the retarded components may be represented as radius vectors at consecutive phase angles Θ1, Θ2, Θ3, ... as shown in FIG. 6. The angles enable us to "weight" the various vectors to reflect the birefringence factor. Such vectors, accordingly, add to provide an ever increasing resultant along the +b axis as long as the phase angle defined by any particular radius vector does not exceed 180°. If the angle does exceed 180°, the corresponding radius vector is in a direction which diminishes that resultant.

Maximum contrast in accordance with this invention is realized by maximizing the resultant of the radius vectors. The contrast to be maximized is the difference in light passed by a reverse-magnetized domain at an output position in a magnetic sheet as compared to light passed when a domain is absent there. The magnetization of a domain is reversed from that of the remainder of the sheet. Accordingly, the effect of consecutive (incremental) planes in the sheet is to rotate the components one way, say clockwise or positive, when a domain is present and the other way (negative) when a domain is absent.

Figure 7:
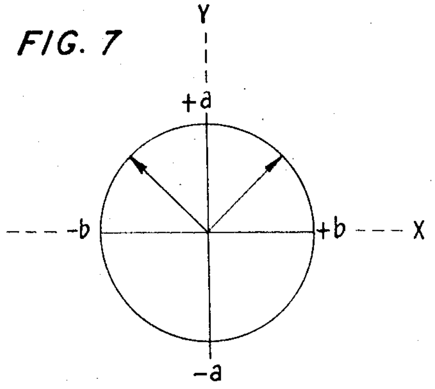

FIG. 7 shows an imaginary circle where the $a$ axis of the crystal is taken to be along the $y$ axis and the $b$ axis is taken along the $x$ axis. The sum of the nonretarded components of the transmitted light may be thought of as aligned along the +a axis, and the sum of the retarded components may be thought of as aligned along the $+b$ and $-b$ axes for the cases when a domain is present and a domain is absent respectively. The resultant ($a$ and $b$) in each instance may be expressed as a radius vector in the first or in the second quadrant (because of the opposite magnetizations) and the angles which each of those resultants make with the $+a$ axis are to be maximized for maximum contrast. Consequently, the $b$ component of each of those resultants is to be maximized and, therefore, the sum of the retarded components as light passes consecutive (incremental) planes in the sheet is to be maximized.

But that $b$ component is increasing only so long as the radius vectors of FIG. 4 are not retarded in excess of 180° ($\pi$ radians) as shown in FIG. 6. Accordingly, the thickness of sheet 11 of FIG. 1 is chosen such that the radius vector associated with the last incremental element of thickness causes a phase retardation of about 180°. It should be understood that if the thickness is chosen such that the last incremental element defines an angle of 360°, ($2\pi$) Faraday rotation provides no contrast at all.

The mathematics may be understood in connection with FIG. 4. We assume, for simplicity, that incident light has a polarization vector along the $a$ axis. This may be ensured by polarizer 21 of FIG. 1 if a laser is not used as source 13. The optical output can be characterized as an ellipse the major axis of which makes an angle $\alpha$ with the $x$ axis and the shape of which is determined by $\beta=y'/x'$ where $x'$ and $y'$ are the semimajor and semiminor axes of the ellipse. Alpha ($\alpha$) and $\beta$ can be calculated approximately from $$\alpha=\chi/2 \sin \Phi$$

and $$\beta=\chi \sin^2(\Phi/2)$$

where $\Phi=2\pi/\delta$, $\chi$ is a parameter relating the strength of the Faraday rotation to the birefringence (in the absence of birefringence, $\sin \chi=1$ and $\chi=90°$; in the absence of Faraday rotation, $\sin \chi=0$ and $\chi=0$), $\Phi$ is the phase shift difference between the retarded and nonretarded waves, T is the thickness of the material, and $\delta$ is the thickness of the material that would have $2\pi$ retardation. These formulae are entirely valid only for small values of $\chi$, for materials that show negligible dichroism and for monochromatic light.

If the sense of magnetization is switched, then $\chi$ changes sign.

The above formulae can be derived from a basic understanding of the Faraday effect and of the effects of birefringence. The parameters (**), ($\Phi$) are functions of the wavelength.

If a thickness T was chosen such that $$\left.\begin{matrix}\frac{2\pi T}{\delta}=n2\pi \\ T=n\delta\end{matrix}\right\} \text{or} \left\{\varphi=n2\pi\right.$$

then both $\alpha$ and $\beta$ are zero and there is no contrast between the two senses of magnetization as discussed in detail in my aforementioned application. This statement is entirely true only for monochromatic light; in white light there will generally be some contrast at some of the wavelengths. If $T=(n+\frac{1}{2})\delta$, on the other hand, contrast is maximized.

The contrast is detected by the use of an analyzer 22 plus a quarter wave plate 23 in the light path after the orthoferrite as shown in FIG. 1. These elements operate in a conventional manner to rotate light, passed when a domain is absent, to an orientation which is extinguished by the analyzer.

Figure 9:
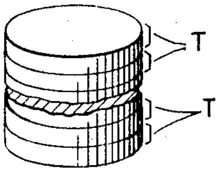
Figure 8:
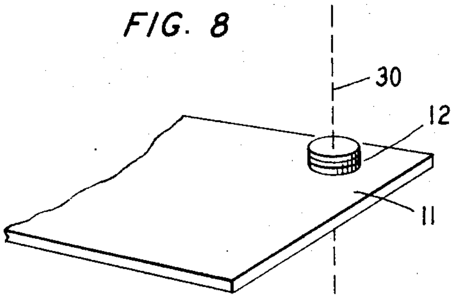

In accordance with this invention, a plurality of layers of magnetic material of the type described is disposed in the optical path indicated by the broken line 30 in FIG. 8. Each of those layers has a thickness less than or about the thickness T as indicated in FIG. 9 and a like magnetization. In this structure, Faraday rotation increases with thickness if consecutive layers are oriented at about 90° with respect to one another. The layers are conveniently of uniform thickness.

The reason for increased Faraday rotation can be understood from an expansion of the explanation of FIG. 7. The objective is to change the periodic contribution of birefringence into a continually increasing enhancement of Faraday rotation. Since it is the retarded component of incident light (along the $b$ axis in FIG. 7) that accounts for the periodicity, the layered structure is arranged to alter that periodicity so that the contribution is always additive. In a first layer, enhancement of Faraday rotation occurs so long as the incident light has a component along the $+b$ axis as shown in FIG. 7. The second layer is oriented so that the output of layer I generates a component along the $+a$ axis of layer II.

Consider that the light as it emerges from the first layer in the optical path is incident upon the second. Accordingly, we have a nonretarded component aligned along the $+a$ axis of the first layer at a first characteristic phase angle. We also have a component which, because of Faraday rotation, is aligned along the $+b$ axis of the first layer at a second characteristic phase angle. Both are incident to the second layer and thus constitute the input to that layer.

We can now treat these components as we treated light incident to the first layer. In this instance, however, the crystallographic axes are rotated 90° so that the $-b$ axis is oriented as is the $+a$ axis in the first layer and the $+a$ axis is oriented as is the $+b$ axis in the first.

Figure 10:
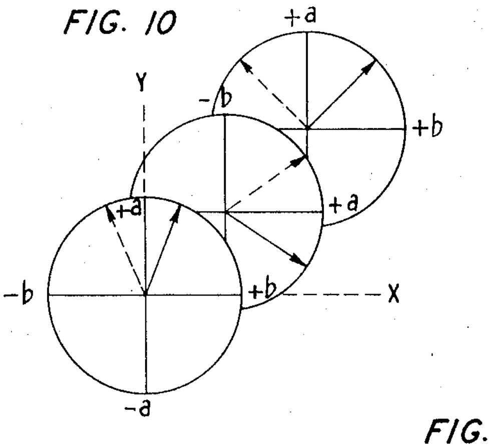

Now consider the second layer as also comprising a number of planes of incremental thickness as was discussed in connection with FIG. 5. Since the crystal (layer II) is in a rotated orientation with respect to layer I, the previously nonretarded component, in this case, is aligned with the $-b$ axis as shown in FIG. 10 and the retarded component is aligned with the $+a$ axis. Let us first direct our attention to the now retarded component along the $-b$ axis. As each of these retarded components passes each incremental plane in the second layer, it generates a component along the $+a$ axis as may be represented again by FIG. 6, bearing in mind that the $+a$ axis of layer II is aligned with the $+b$ axis of layer I. The components add, as before, to provide an ever increasing resultant along the (now) $+a$ axis as long as the phase angle defined by the radius vector associated with any particular component does not exceed 180°.

It is clear, then, that as light passes the first layer, contrast is maximized when the thickness of the layer is less than thickness T. For the second layer, it is equally clear that contrast is maximized again so long as the thickness of that layer similarly does not exceed thickness T. For the two layer structure having a total thickness of about 2T or less, birefringence is seen to increase Faraday rotation continually as long as the layers are in the proper relative orientations. Accordingly, layers may be added in this manner such that Faraday rotation increases with thickness limited only by acceptable absorption requirements.

The components emerging from the first layer parallel to $+b$ are small compared to those aligned with $+b$, and although they are rotated by the second layer, they affect the result only negligibly and for qualitative purposes can be ignored.

The various optical components can be assessed mathematically by a transfer matrix:

$$\begin{pmatrix} \cos\frac{\varphi}{2}-i\cos\chi\sin\frac{\varphi}{2}\cos 2\theta & +\sin\chi\sin\frac{\varphi}{2}-i\cos\chi\sin\frac{\varphi}{2}\sin 2\theta \\ -\sin\chi\sin\frac{\varphi}{2}-i\cos\chi\sin\frac{\varphi}{2}\sin 2\theta & \cos\frac{\varphi}{2}+i\cos\chi\sin\frac{\varphi}{2}\cos 2\theta \end{pmatrix}$$

where $\Phi=T/\delta(2\pi)$ (birefringence thickness), $\Theta$ is the angle the Y axis makes with the nonretarding crystal axis, and $\chi$ is a parameter relating the strength of the Faraday rotation to the birefringence.

When $\chi$ is small so that $\sin\chi$ $\chi$ and $\cos\chi$ 1 and $\Phi=180°$, the matrix yields (for $\Theta=0°$ input, amplitude along $Y=a$ and along $X=o$)

$$\begin{pmatrix} & i\chi \\ -\chi & i \end{pmatrix}\begin{pmatrix} o \\ a \end{pmatrix}=\begin{pmatrix} \chi a \\ ia \end{pmatrix}$$ as the output of layer I; and (for $\Theta=90°$, input amplitude along $Y=\chi a$ and along $X=ia$)

$$\begin{pmatrix} & i\chi \\ -\chi & -i \end{pmatrix}\begin{pmatrix} \chi a \\ ia \end{pmatrix}=\begin{pmatrix} 2i\chi \\ a \end{pmatrix}$$ as the output of layer II;

and where terms containing $\chi^2$ have been dropped as they are small.

Figure 11:
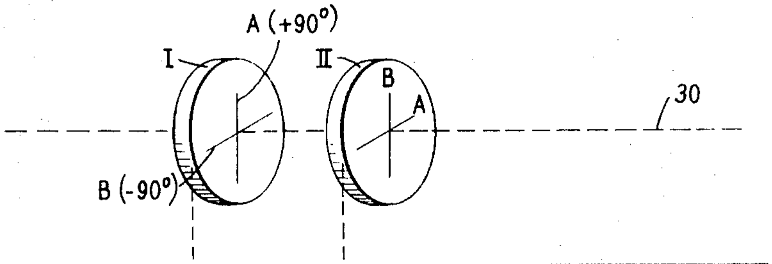
FIG. 11 is a chart representing the optical input and outputs to a layered structure in accordance with this invention.

The results given by the matrix can be visualized in connection with the chart of FIG. 11. In order to be in agreement with the matrix formulation, the A and B axes of layer I in FIG. 11 are designated as the +90° (advanced) axis and −90° (retarded) axis. This designation indicates the 180° phase retardation spread discussed in connection with FIG. 6 and indicates that when the phase retardation is zero, the light component is aligned along the +90° axis and when the retardation is 180°, the component is aligned along the −90° axis.

Consider light incident to layer I along optical path 30 in FIG. 11 and having a polarization vector aligned with the A axis. This input light is represented by an arrow designated $a^o$ in FIG. 11. The $a$ represents the orientation of the light with the A axis; the zero indicates the phase angle of the light. That input generates a component retarded 90° by layer I and so is represented as $a^{+90}$ at the output of that layer. The output due to Faraday rotation can be represented by an arrow designated $\chi a^o$ aligned with the B axis in FIG. 11; this can be seen to correspond to the results reached in accordance with the matrix. The phase angle associated with the components due to Faraday rotation is zero in this case, but in agreement with the previous case in that it is 90° retarded with respect to the component along A. The two components constitute the input to layer II.

The component $a^{+90}$ at the input of layer II is retarded an average of 90° as it passes layer II. Since layer II is oriented at 90° with respect to layer I, the consistent retardation notation is $a^0$, the designation of the arrow in the third column of the chart of FIG. 11.

The component $a^{+90}$ at the input of layer II also generates a Faraday component of $\chi a^{+90}$ at the output of layer II. The Faraday input of layer II, $\chi$ $a^o$, transfers through layer II and is advanced +90°, since it is aligned with the A axis of that crystal, to become $\chi a^{+90}$. The two Faraday outputs of layer II add to become $2\chi a^{+90}$ in agreement with the matrix used above. The $\chi^o$ input to layer II will also produce components along the −B axis of layer II but these components are small and are neglected; this is equivalent to dropping terms of $\chi^2$ in the matrix formulation.

Since these two Faraday generated birefringent produced components are additive, Faraday rotation is enhanced by each; the birefringence in each of layers I and II is seen to enhance Faraday rotation in realization of our objective.

Figure 12:
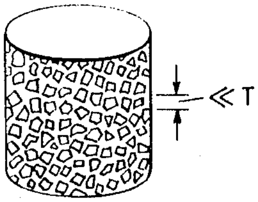
FIG. 12 is an illustration of an alternative layered structure in accordance with this invention.

This enhancement can be achieved also by crystal particles in a suitable binder as illustrated in FIG. 12. The particles may, for example, comprise an orthoferrite prepared by powdering, or chemical precipitation, and having a mean size much smaller than T (several hundreds of Angstroms in the case of the orthoferrites). The particles can be pressed together with a small percentage of a binder, such as a thermosetting epoxy resin. Proper alignment of the crystal particles is achieved by placing the powder in a magnetic field before pressing or before the binder has hardened. For particles of the size specified, the resulting structure appears to incident light like the multiple layered structure described hereinbefore.

Although the proposed explanation for the utilization of birefringence effects is articulated in terms of like layer thickness of T corresponding to 180° retardation, those layers need not correspond to 180° retardation nor be of like thickness so long as the thickness of each is less than about T.

An assumption of the explanation is that the magnetizations of layers I and II are alike, illustratively, to the right along the optic path 30 in FIG. 11. It should be clear to those skilled in the art from a consideration of the matrix above that like results can be achieved if adjacent layers in accordance with this invention have opposite magnetizations and the same crystal orientation and, most simply, the same layer thicknesses. For example, layer II of FIG. 11 could have its magnetization directed to the left along 30 rather than layer II being oriented at 90° with respect to layer I. Similarly, layer II could be a mirror with like results for the reflected wave. Also, half-wave plates may be positioned between layers or may constitute a plane of each layer to eliminate the need for the 90° angular displacement between consecutive layers.

As is stated above, the multilayered arrangement in accordance with this invention is intended, for example, to improve optical readout of domain propagation devices by Faraday rotation. Accordingly, FIG. 1 shows a multilayered arrangement only at that position of such a device where such readout occurs. Design considerations may dictate that a single wall domain propagate in a sheet of constant thickness however. Therefore, it may be practical for sheet 11 of FIG. 1 to be of a uniform thickness and, so, be of a multilayered structure in its entirety.

What has been described is considered only illustrative of the principles of this invention. Accordingly, other and different arrangements according to the principles of this invention may be devised by one skilled in the art without departing from the spirit and scope of this invention.

What I claim is:

1. Apparatus comprising a plurality of layers of birefringent magnetic material which exhibits Faraday rotation, each of said layers having along an optical path a thickness T about equal to or less than $(n+\frac{1}{2})\delta$ where $\delta$ is the thickness of each layer for $2\pi$ retardation of radiation of wavelength $\lambda$ and $n$ is a whole number, adjacent ones of said layers having an orientation and a magnetization such that light directed along said optical path generates Faraday components in one of said layers which are additive to similarly generated components in adjacent layers.

2. Apparatus in accordance with claim 1 wherein said adjacent layers are of opposite magnetization and have the axes thereof aligned with one another.

3. Apparatus in accordance with claim 1 wherein each of said layers has a first magnetization and orientation and comprises a half-wave plate.

4. Apparatus in accordance with claim 1 wherein said layers are of like magnetization and have their axes oriented at angles with respect to one another.

5. Apparatus in accordance with claim 4 wherein each of said angles is about 90°.

6. Apparatus in accordance with claim 4 wherein said layers comprise crystalline particles in a binder.

7. Apparatus in accordance with claim 5 wherein at least one of said layers is capable of having single wall domains moved therein.

8. Apparatus in accordance with claim 7 in combination with a source of polarized light and means for detecting the passage of said light through said plurality of layers at an output position.

9. A combination in accordance with claim 8 also including means for selectively moving single wall domains to said output position.

10. Apparatus comprising a multilayered sheet of birefringent magnetic material which exhibits Faraday rotation and in which single wall domains can be moved, means for defining in said sheet a plurality of locations for single wall domains, means for moving single wall domains to selected ones of said positions, each of the layers of said sheet having a thickness $T=(n+\frac{1}{2})\delta$ where $\delta$ is the thickness of the sheet for $2\pi$ retardation of radiation of wavelength $\lambda$ transmitted therethrough and where $n$ is a whole number, and means for directing at a selected one of said positions in said sheet radiation of wavelength $\lambda$.